US008665211B2

(12) United States Patent
Kitahara et al.

(10) Patent No.: US 8,665,211 B2
(45) Date of Patent: Mar. 4, 2014

(54) POSITION DETECTING DEVICE AND POSITION INPUT DEVICE

(75) Inventors: Noriyuki Kitahara, Saitama (JP); Ke Chao, Saitama (JP)

(73) Assignee: Wacom Co., Ltd., Saitama (JP)

( * ) Notice: Subject to any disclaimer, the term of this patent is extended or adjusted under 35 U.S.C. 154(b) by 223 days.

(21) Appl. No.: 13/045,319

(22) Filed: Mar. 10, 2011

(65) Prior Publication Data

US 2011/0234485 A1    Sep. 29, 2011

(30) Foreign Application Priority Data

Mar. 25, 2010  (JP) ................................ 2010-069427

(51) Int. Cl.
    *G09G 5/00* (2006.01)
(52) U.S. Cl.
    USPC .................. 345/156; 324/207.11; 324/207.16
(58) Field of Classification Search
    USPC ................. 345/156–173; 178/18.07
    See application file for complete search history.

(56) References Cited

U.S. PATENT DOCUMENTS

| | | | | |
|---|---|---|---|---|
| 5,136,125 | A * | 8/1992 | Russell | 178/18.07 |
| 6,580,264 | B2 * | 6/2003 | Nekado | 324/207.16 |
| 2003/0102862 | A1 * | 6/2003 | Goto et al. | 324/207.16 |
| 2006/0267580 | A1 | 11/2006 | Fukushima et al. | |

FOREIGN PATENT DOCUMENTS

| | | |
|---|---|---|
| JP | 04096212 A | 3/1992 |
| JP | 05143224 A | 6/1993 |
| JP | 2006309308 A | 11/2006 |
| JP | 2007157107 A | 6/2007 |

OTHER PUBLICATIONS

Japanese Office Action dated Oct. 22, 2013, for corresponding JP Application No. 2010-069427, 2 pages.

* cited by examiner

*Primary Examiner* — Kevin M Nguyen
*Assistant Examiner* — Kenneth B Lee, Jr.
(74) *Attorney, Agent, or Firm* — Seed IP Law Group PLLC

(57) ABSTRACT

A position detecting device is provided, which is configured to minimize leakage of magnetic flux in an electromagnetic induction system. The position detecting device includes: a sensor unit including a plurality of first loop coils arranged in a first direction and a plurality of second loop coils arranged in a second direction intersecting with the first direction; a yoke sheet provided on a side of the sensor unit that is opposite to a side that faces a position indicator; an auxiliary loop coil provided at a corner part of the sensor unit; a signal transmitter configured to transmit a signal to one of the coils in order to generate a magnetic field to induce an induced current in a coil of the position indicator; and a controller configured to select one of the coils, and to control whether to transmit a signal from the signal transmitter to the selected one of the coils or to make the selected one of the coils receive a signal from the position indicator.

18 Claims, 13 Drawing Sheets

FIG.10

| POSITION OF POSITION INDICATOR | COORDINATE DETECTION | CORRESPONDING TRANSMITTING COIL | CORRESPONDING RECEIVING COIL |
|---|---|---|---|
| AREA A | X COORDINATE DETECTION | X COIL | X COIL |
| | Y COORDINATE DETECTION | X COIL | Y COIL |
| AREA B | X COORDINATE DETECTION | Y COIL | X COIL |
| | Y COORDINATE DETECTION | Y COIL | Y COIL |
| AREA C | X COORDINATE DETECTION | X COIL OR Y COIL | X COIL |
| | Y COORDINATE DETECTION | X COIL OR Y COIL | Y COIL |
| AREA D | X COORDINATE DETECTION | AUXILIARY COIL | X COIL |
| | Y COORDINATE DETECTION | AUXILIARY COIL | Y COIL |

POSITION DETECTING DEVICE AND POSITION INPUT DEVICE

CROSS-REFERENCE TO RELATED APPLICATION

The present application claims priority under 35 U.S.C. §119(a) of Japanese Application No. 2010-069427, filed Mar. 25, 2010, the entire content of which is incorporated herein by reference.

BACKGROUND OF THE INVENTION

1. Field of the Invention

This invention relates to a position detecting device of an electromagnetic induction system and a position input device including this position detecting device.

2. Description of Related Art

As disclosed in e.g. Japanese Patent Laid-Open No. 2006-309308, a position input device composed of a pen-type position indicator and a position detecting device is known. The position detecting device includes a sensor unit for detecting the position indicated by the position indicator.

This sensor unit generally includes a sensor substrate of a flat plate shape and an indication detecting plane to detect the input position indicated by the position indicator. In the case of a position detecting device of an electromagnetic induction system, on the sensor substrate, a large number of long thin loop coils are so provided as to be arranged in each of the X-axis direction and the Y-axis direction. The position indicator includes a resonant circuit composed of a coil and a capacitor.

Furthermore, the position detecting device makes a current of a specific frequency (i.e., a transmission current for excitation) flow through the respective loop coils of the sensor unit, one coil by one coil, to generate a magnetic field from the loop coils. When the position indicator is close to the loop coil generating the magnetic field, the resonant circuit of the position indicator resonates due to electromagnetic induction to generate an induced magnetic field. Next, the generation of the magnetic field from the loop coil is stopped. Subsequently, the induced magnetic field generated from the resonant circuit of the position indicator is received by the loop coil and a signal current (i.e., a reception current) flowing through the loop coil is detected. The position detecting device carries out this operation for each one of the loop coils and detects the position of the position indicator based on the reception current.

Directly beneath the sensor substrate, on which a large number of loop coils are formed, a magnetic path sheet (i.e., a yoke sheet) to stabilize the magnetic characteristics of the loop coil is provided. If a conductor plate such as an earth substrate is provided directly beneath the sensor substrate, on which a large number of loop coils are formed, an eddy current flows through the conductor plate due to the influence of an alternating magnetic field from the loop coil, and this eddy current adversely affects the operation of the device. Therefore, the magnetic path sheet (the yoke sheet) is so configured as to work also as a shield member (refer to, e.g., Japanese Patent Laid-Open No. 2007-157107).

SUMMARY OF THE INVENTION

When the transmission current for excitation is made to flow through the loop coil at the peripheral part of the sensor unit (at the vicinity part of the end part (end edge) of the sensor substrate), the amount of leakage of magnetic flux to the external is larger compared with the loop coil at the center part of the sensor unit (at the part surrounded by the peripheral part), and possibly the magnetic flux leaks to the external as unnecessary radiation.

Specifically, as shown in FIGS. 16A and 16B, a yoke sheet 200 is disposed directly beneath the sensor unit on which plural loop coils 100 are formed. As shown in FIG. 16A, magnetic flux 301, which is generated when the transmission current for excitation flows through the loop coil 100 at the center part inside the end part of the sensor unit among the plural loop coils 100, passes through the yoke sheet 200 and hardly leaks to the external.

In contrast, as shown in FIG. 16B, magnetic flux 302, which is generated when the transmission current for excitation flows through the loop coil 100 at the peripheral part of the sensor unit, leaks from the end part of the yoke sheet 200 to the external. Furthermore, because the peripheral part of the sensor unit involves many factors interfering with transmission/reception to/from the position indicator, a larger current is made to flow through the loop coil 100 at the peripheral part compared with the other part. This also causes the large leakage of magnetic flux at the peripheral part of the sensor unit.

There is a need to provide a position detecting device and a position input device capable of reducing leakage of magnetic flux.

According to an aspect of this invention, there is provided a position detecting device including a sensor unit including a plurality of first loop coils that are so provided as to be arranged in a first direction and a plurality of second loop coils that are so provided as to be arranged in a second direction intersecting with the first direction, a yoke sheet provided on the opposite side to a position indicator across the sensor unit, and an auxiliary loop coil provided at a corner part of the sensor unit. The position detecting device further includes a signal transmitter configured to transmit a signal to one of the first loop coil, the second loop coil, and the auxiliary loop coil in order to generate a magnetic field to induce an induced current in a coil of the position indicator, and a controller configured to select one of the first loop coil, the second loop coil, and the auxiliary loop coil, and to control whether to transmit a signal from the signal transmitter to one of the first loop coil, the second loop coil, and the auxiliary loop coil or to make one of the first loop coil, the second loop coil, and the auxiliary loop coil receive a signal from the position indicator.

According to exemplary embodiments of this invention with the above-described configuration, due to the provision of the auxiliary loop coil for transmission at the corner of the sensor unit, the first loop coils at the peripheral parts of the sensor unit that extend perpendicular to the first direction and the second loop coils at the peripheral parts of the sensor unit that extend perpendicular to the second direction can be used only as the coils for reception to detect a signal dependent on the magnetic field from the position indicator by electromagnetic induction, without being used as the coils for transmission. Therefore, leakage of magnetic flux from the end part of the sensor unit can be reduced.

According to exemplary embodiments of this invention, the provision of the auxiliary loop coil for transmission at the corner of the sensor unit allows for an operation in which the first loop coils are not used as the coils for transmission at the peripheral parts that extend perpendicular to the first direction and the second loop coils are not used as the coils for transmission at the peripheral parts that extend perpendicular to the second direction. Thus, leakage of magnetic flux from the end part of the sensor unit can be reduced.

BRIEF DESCRIPTION OF THE DRAWINGS

FIG. 10 is a diagram for explaining setting of transmission and reception regarding the loop coils in the position detecting device of the embodiment of this invention;

DETAILED DESCRIPTION OF THE PREFERRED EMBODIMENT

A position detecting device and a position input device according to an embodiment of this invention will be described below with reference to the drawings.

[Position Input Device]

Figure 1:
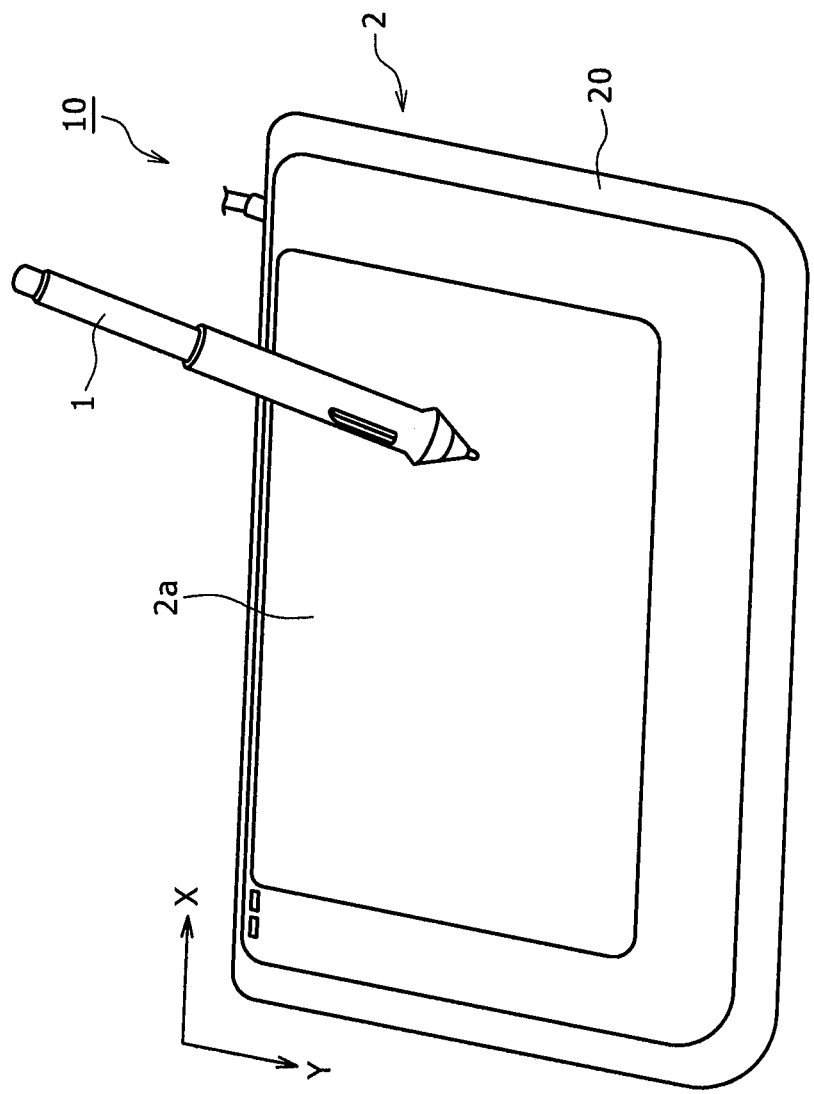
FIG. 1 is a diagram showing the appearance of a position input device of an embodiment of this invention.

FIG. 1 is an appearance perspective view of the position input device according to the embodiment of this invention. A position input device 10 of this embodiment is composed of a pen-type position indicator 1 and a position detecting device 2. The position detecting device 2 includes a position detecting plane 2a and detects the position indicated by the position indicator 1 on this position detecting plane 2a to output the detected position data to an external apparatus such as a personal computer. In the following description, an X-Y rectangular coordinate system is assumed to be defined by the horizontal direction of this position detecting plane 2a as the X axis and the vertical direction as the Y axis, and it is assumed that the position indicated by the position indicator 1 is detected as X and Y coordinates.

[Position Detecting Device]

Figure 2:
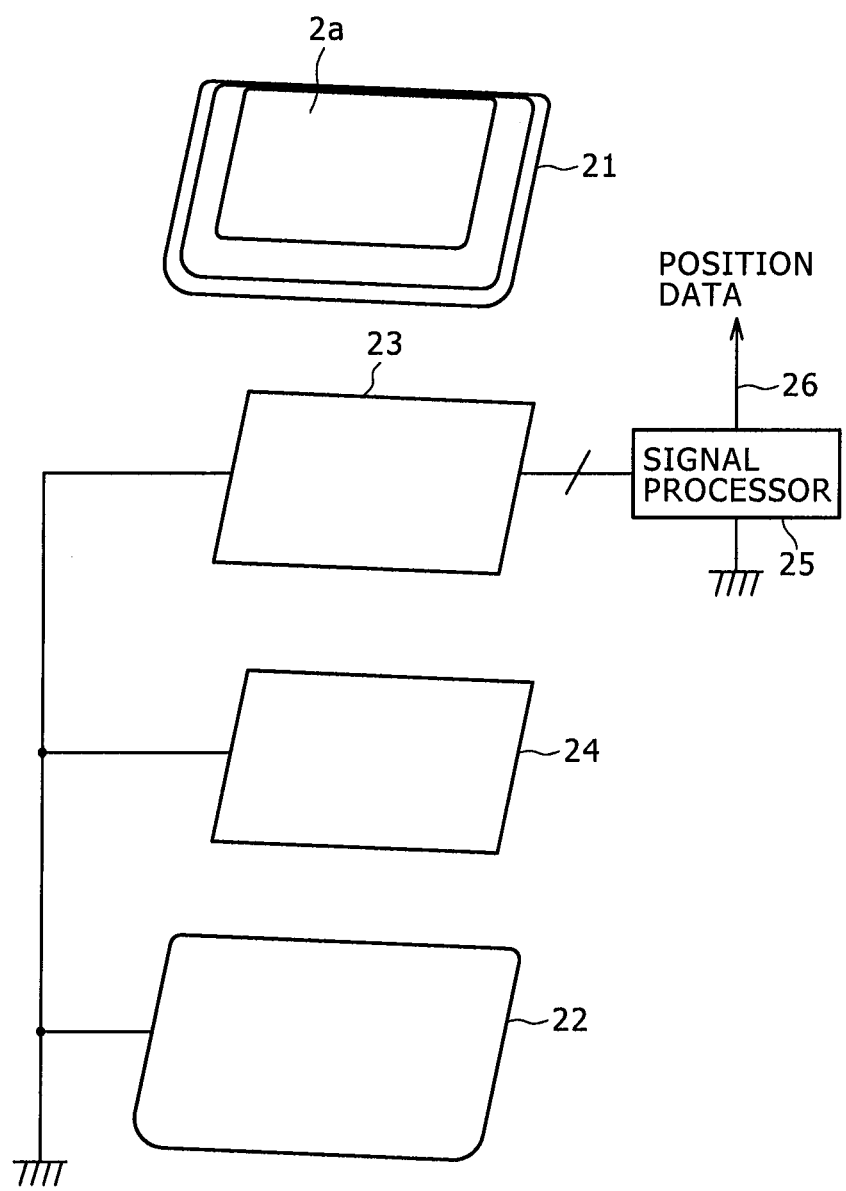
FIG. 2 is an exploded perspective view for explaining a configuration example of a position detecting device of the embodiment of this invention.

FIG. 2 is an exploded perspective view schematically showing the configuration of the position detecting device 2. The position detecting device 2 of this example has a structure in which a sensor unit 23, a yoke sheet 24, and a signal processor 25 are housed in a housing composed of an upper case 21 and a lower case 22.

The upper case 21 serves as the upper-side part of a housing 20 of the position detecting device 2. This upper case 21 includes the position detecting plane 2a formed of an insulating plate of, for example, plastic or glass.

The sensor unit 23 is disposed directly beneath the position detecting plane 2a of this upper case 21. This sensor unit 23 is formed of a rectangular printed wiring board (hereinafter referred to as the sensor substrate) on which plural loop coils are formed as a wiring pattern as described later.

Figure 3:
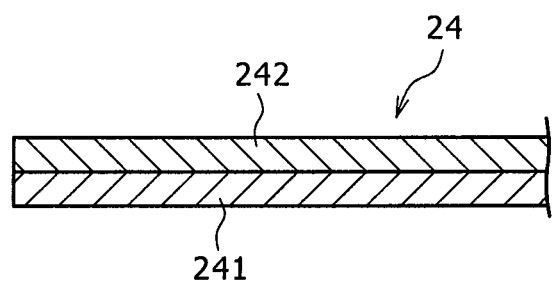
FIG. 3 is a diagram for explaining a configuration example of a yoke sheet in the position detecting device of FIG. 2 in the embodiment.

The yoke sheet 24 is disposed directly beneath the sensor unit 23. This yoke sheet 24 has substantially the same size as that of the sensor unit 23. As shown in a sectional view of FIG. 3, this yoke sheet 24 is obtained by forming a high magnetic layer 242 of, for example, an amorphous magnetic metal on a shield sheet 241 formed of, for example, an aluminum foil. The high magnetic layer 242 is formed by depositing, for example, a large number of amorphous magnetic metal ribbons on the shield sheet 241 of the aluminum foil.

The signal processor 25 is connected to the sensor unit 23. As described later, this signal processor 25 includes a signal generator to generate an AC (alternate current) signal of a predetermined frequency to be supplied to the plural loop coils of the sensor unit 23, and a position detector to detect a signal current arising in the loop coil due to electromagnetic induction with the position indicator 1 to thereby detect the position indicated by the position indicator 1.

This signal processor 25 outputs position data of the position indicator 1 to the external apparatus such as a personal computer via, for example, a USB interface cable 26.

As shown in FIG. 2, the components except the upper case 21 formed of an insulator, i.e. all of the sensor unit 23, the yoke sheet 24, and the lower case 22 are grounded.

[Sensor Unit 23 of Position Detecting Device 2]

Figure 4:
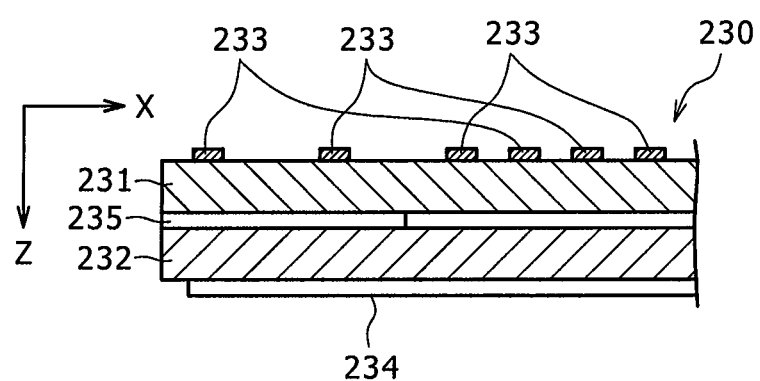
FIG. 4 is a diagram for explaining a configuration example of a sensor unit in the position detecting device of FIG. 2 in the embodiment.

The sensor substrate included in the sensor unit 23 is formed of a two-layer printed wiring board in this example. FIG. 4 shows part of a sectional view of this sensor substrate 230 along the X-axis direction. The sensor substrate 230 is obtained by stacking a first layer substrate 231 and a second layer substrate 232 in the Z-axis direction perpendicular to the X axis and the Y axis.

On the surface of the first layer substrate 231 on the side of the upper case 21, plural first loop coils 233 are so provided as to be arranged in the X-axis direction at every predetermined interval. Hereinafter, the first loop coil will be referred to as the X coil.

On the surface of the second layer substrate 232 on the side of the lower case 22, plural second loop coils 234 are so provided as to be arranged in the Y-axis direction at every predetermined interval. Hereinafter, the second loop coil will be referred to as the Y coil.

Furthermore, plural auxiliary loop coils 235 are provided between the opposing surfaces of the first layer substrate 231 and the second layer substrate 232. Hereinafter, the auxiliary loop coil will be abbreviated as the auxiliary coil.

Figure 5:
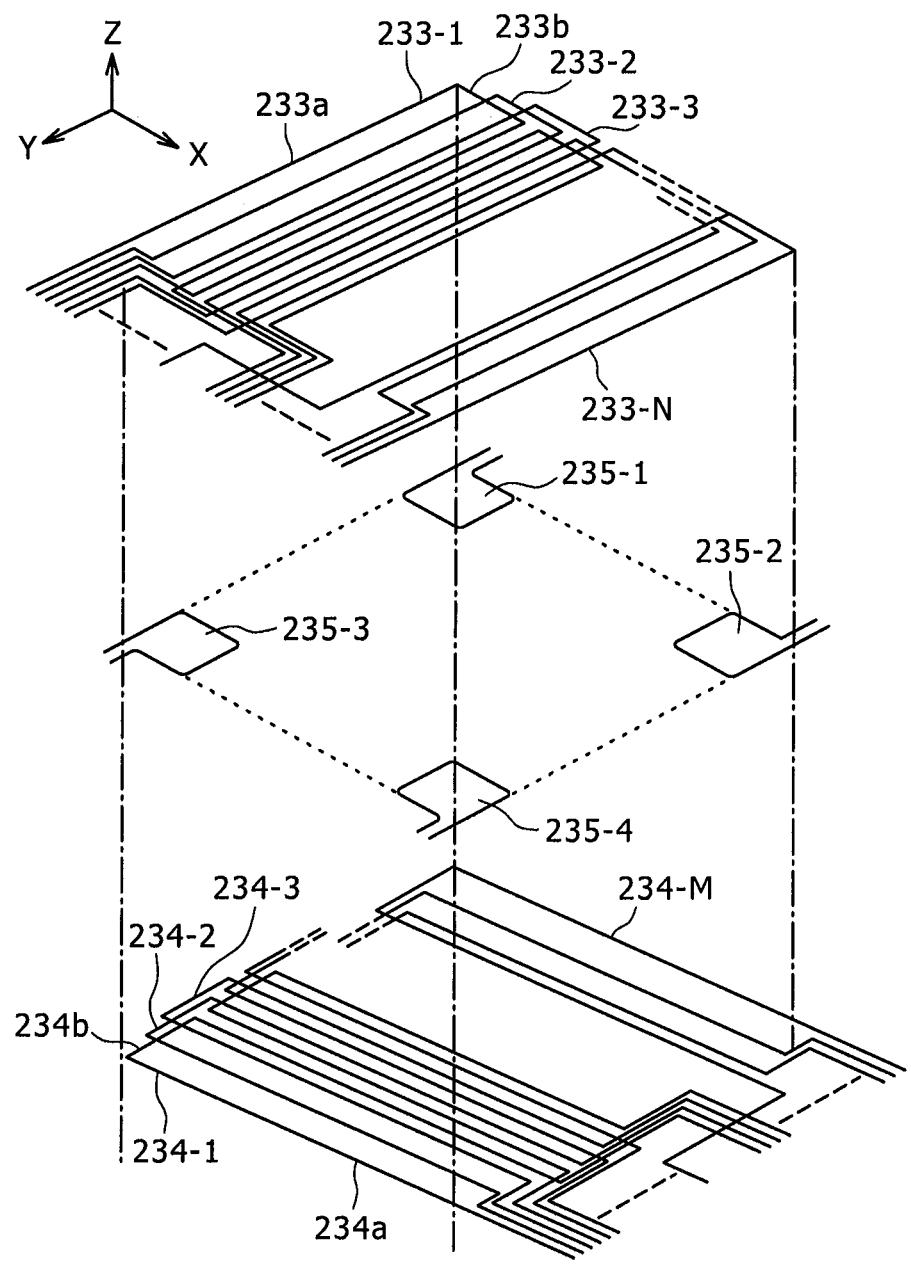
FIG. 5 is a diagram for explaining a configuration example of the sensor unit in the position detecting device of FIG. 2 in the embodiment.

FIG. 5 is a diagram showing the arrangement state of the X coils 233, the Y coils 234, and the auxiliary coils 235 provided on the sensor substrate 230.

As shown in FIG. 5, in the X-axis direction, plural X coils 233-$i$ ($i$=1, 2, 3 . . . N (N is an integer equal to or larger than two)) are arranged. The X coils 233-$i$ are each a one-turn loop coil extended along the Y-axis direction and are so arranged as to be in parallel to each other and overlap with each other. Each X coil 233-$i$ includes a longer side 233$a$ along the Y-axis direction and an end part 233$b$ as the loop bent part. The length of the longer side 233$a$ is set almost equal to the distance between both ends of the sensor substrate 230 in the Y-axis direction. That is, the longer side 233$a$ of the X coil 233-$i$ is extended to both end parts of the sensor substrate 230 in the Y-axis direction.

Although loop coils with shapes having the longer sides 233$a$ and 234$a$ and the end parts 233$b$ and 234$b$ are employed as the X coil 233 and the Y coil 234, loop coils having, for example, any rectangular shape, a square shape, an oblong shape or another shape may be employed as well.

In the Y-axis direction, plural Y coils 234-$j$ ($j$=1, 2, 3 . . . M (M is an integer equal to or larger than two)) are arranged. The Y coils 234-$j$ are each a one-turn loop coil extended along the X-axis direction and are so arranged as to be in parallel to each other and overlap with each other. Each Y coil 234-$j$ includes the longer side 234$a$ along the X-axis direction and the end part 234$b$ as the loop bent part. The length of the longer side 234$a$ is set almost equal to the distance between both end edges of the sensor substrate 230 in the X-axis direction. That is, the longer side 234$a$ of the Y coil 234-$j$ is extended to both end parts of the sensor substrate 230 in the X-axis direction.

In the whole range of the area in which the plural X coils 233 and the plural Y coils 234 are provided in the above-described manner, a signal transmitted from the position indicator 1 can be received by the sensor unit 23 as described later. That is, the whole of the area in which the X coils 233 and the Y coils 234 are provided can be made to function as the effective area capable of detecting the position of the position indicator 1. The position detecting plane 2$a$ of the position detecting device 2 is so configured as to overlap with this effective area.

The X coils 233 and the Y coils 234 are formed from a printed pattern of one or plural layers on the first layer substrate 231 and the second layer substrate 232 of the sensor substrate 230. The X coils 233 and the Y coils 234 are not limited to coils configured with one turn and may have a plural-turn configuration as need.

At four corners of the sensor substrate 230, auxiliary coils 235-1 to 235-4 are provided. Specifically, at four corners of the whole area of the rectangular shape in which the X coils 233 and the Y coils 234 are provided, four auxiliary coils 235-1 to 235-4 are so provided as to overlap with the X coils 233 and the Y coils 234.

[Avoidance of Problem of Leakage of Magnetic Flux and Auxiliary Coil 235]

The reason for the provision of the auxiliary coils 235-1 to 235-4 will be described below.

Figure 16A:
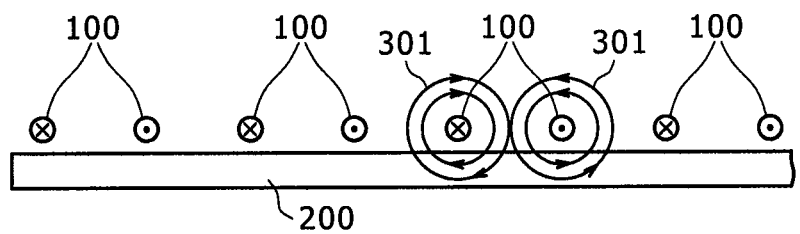
FIGS. 16A and 16B are diagrams for explaining unnecessary radiation of leaking magnetic flux from a position detecting device.
Figure 16B:
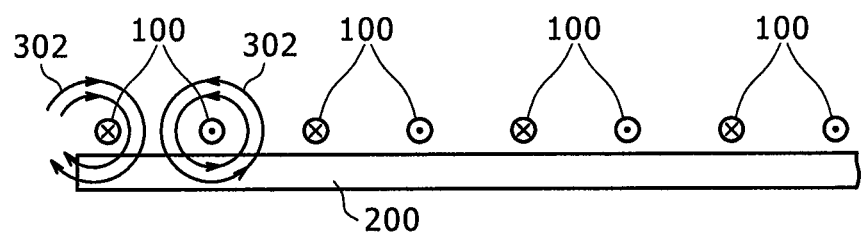

The X coil 233 is extended along the Y-axis direction and includes the longer side 233$a$ along the Y-axis direction and the end part 233$b$ along the X-axis direction. When the transmission current for excitation is made to flow through this X coil 233, magnetic flux interlinked with this X coil 233 is generated. The yoke sheet 24 is provided directly beneath the sensor substrate 230. Therefore, when the transmission current for excitation is made to flow through the X coil 233 located at one of both peripheral parts of the sensor substrate 230 in the X direction, magnetic flux interlinked with the longer side 233$a$ of the X coil 233 leaks to the external from the end part of the yoke sheet 24 in the X direction as described with use of FIGS. 16A and 16B and this leakage of magnetic flux becomes a problem. At this time, magnetic flux interlinked with the end part 233$b$ of the X coil 233 also leaks to the external from the peripheral end part of the yoke sheet 24 in the Y direction. However, because the end part 233$b$ is shorter than the longer side 233$a$, this leakage of magnetic flux is less and causes no problem.

Similarly, the Y coil 234 is extended along the X-axis direction and includes the longer side 234$a$ along the X-axis direction and the end part 234$b$ along the Y-axis direction. When the transmission current for excitation is made to flow through this Y coil 234, magnetic flux interlinked with this Y coil 234 is generated. Magnetic flux interlinked with the longer side 234$a$ of the Y coil 234 leaks to the external from the peripheral end part of the yoke sheet 24 in the Y direction and this leakage of magnetic flux becomes a problem. At this time, magnetic flux interlinked with the end part 234$b$ of the Y coil 234 also leaks to the external from the end part of the yoke sheet 24 in the X direction. However, because the end part 234$b$ is shorter than the longer side 234$a$, this leakage of magnetic flux is less and causes no problem.

Figure 6:
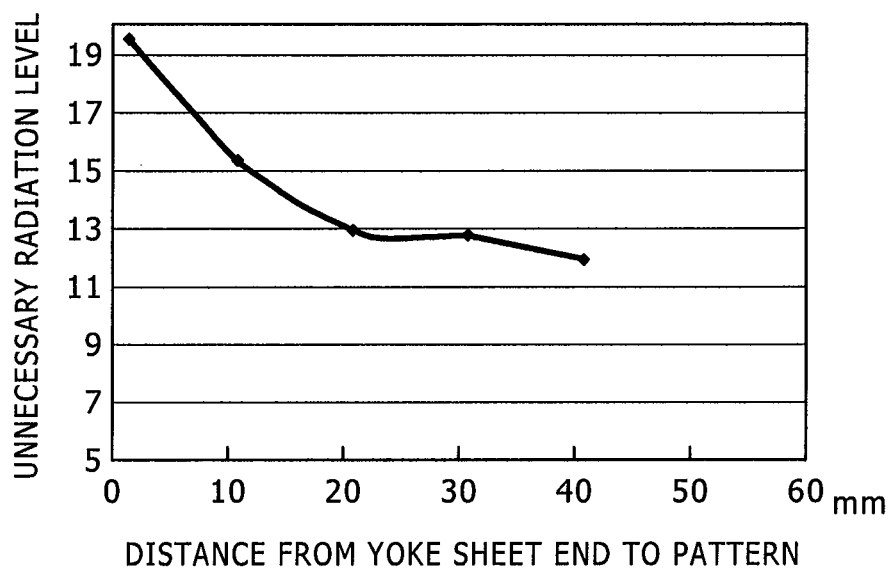
FIG. 6 is a diagram showing the unnecessary radiation characteristic of leaking magnetic flux by a loop coil at the peripheral part of the sensor unit.

For example, the transmission current for excitation was made to flow through the Y coil 234 and leakage magnetic flux was measured. As a result, the result shown in FIG. 6 was obtained. This example of FIG. 6 shows the characteristic obtained when a 60-mA alternating current with a frequency of 667 kHz was made to flow through the Y coil 234 as the transmission current for excitation. The abscissa indicates the distance from the end part of the sensor substrate 230 in the Y direction to the Y coil 234, and the ordinate indicates the unnecessary radiation level.

From FIG. 6, it is discerned that no problem is caused as long as the Y coil 234 is distant from the end part of the sensor substrate 230 in the Y direction by about 1 cm or longer if the threshold of the allowable unnecessary radiation level is 15 dB.

Figure 7:
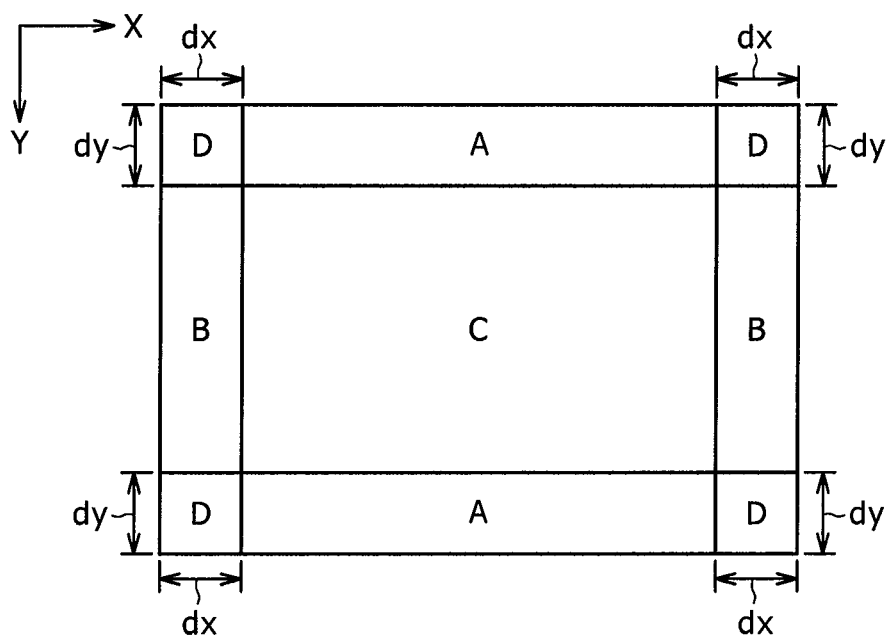
FIG. 7 is a diagram for explaining the provision position of an auxiliary coil used in the position detecting device of the embodiment of this invention.

From the above-described point, to avoid the problem of leakage of magnetic flux, it is sufficient that, as shown in FIG. 7, the X coil 233 to which the transmission current for excitation is supplied is distant from each of both ends of the sensor substrate 230 in the X direction by a predetermined distance dx or longer. Furthermore, it is sufficient that the Y coil 234 to which the transmission current for excitation is supplied is distant from each of both ends of the sensor substrate 230 in the Y direction by a predetermined distance dy or longer. The predetermined distances dx and dy are each the distance, from the end part of the sensor substrate 230, at which the unnecessary radiation level of leaking magnetic flux is equal to or lower than a threshold.

In the following description, of the whole area of the sensor substrate 230, the areas that are within the predetermined distance dy from both ends in the Y direction and are outside the areas within the predetermined distance dx from both ends in the X direction will be referred to as the area A as shown in FIG. 7.

Furthermore, of the whole area of the sensor substrate 230, the areas that are within the predetermined distance dx from both ends in the X direction and are outside the areas within the predetermined distance dy from both ends in the Y direction will be referred to as the area B.

In addition, the areas that are at four corners of the sensor substrate 230 and are within the predetermined distance dx from both ends in the X direction and within the predetermined distance dy from both ends in the Y direction will be referred to as the area D. Moreover, of the whole area of the sensor substrate 230, the center area outside the areas A, the areas B, and the areas D will be referred to as the area C.

As one countermeasure to solve the problem of the unnecessary radiation level of leaking magnetic flux, it will be effective to employ the following configuration. Specifically, the size of the yoke sheet 24 is set to the size of the whole area shown in FIG. 7. In addition, the size of the sensor substrate 230 is set to the size of the area C shown in FIG. 7, and the X coils 233 and the Y coils 234 are disposed only in this area C. If this configuration is employed, the X coils 233 and the Y coils 234 of the sensor substrate 230 exist only at positions distant from the end parts of the yoke sheet 24 by at least the distance dx and the distance dy, so that the problem of leaking magnetic flux is eliminated.

However, in this case, the size of the position detecting plane 2a, whose size is substantially equal to that of the sensor substrate 230, is substantially equal to that of to the area C. In contrast, the size of the yoke sheet 24 needs to be set to a size including the areas A, the areas B, and the areas D around the area C. This causes a problem that the housing 20 of the position detecting device 2 needs to include a large part as the part surrounding the position detecting plane 2a and thus its size inevitably becomes large compared with the size of the position detecting plane 2a.

To avoid this problem, in this embodiment, the sizes of the sensor substrate 230 and the yoke sheet 24 are set almost equal to each other as described above. Furthermore, as described with use of FIG. 5, the X coils 233 and the Y coils 234 are provided across the area of the sensor substrate 230 to both ends in the X direction and both ends in the Y direction similarly to the related art.

However, in this embodiment, to avoid the problem of unnecessary radiation of leaking magnetic flux, the transmission current for excitation is not supplied to the X coils 233 existing in the areas within the distance dx from both end parts of the sensor substrate 230 in the X direction (the areas B and the areas D vertically adjacent to the areas B). Furthermore, the transmission current for excitation is not supplied to the Y coils 234 existing in the areas within the distance dy from both end parts of the sensor substrate 230 in the Y direction (the areas A and the areas D horizontally adjacent to the areas A).

As described later, in this embodiment, the X coil 233 and the Y coil 234 to which the transmission current for excitation is not supplied are used as the loop coil to detect the reception current.

As just described, in this embodiment, the transmission current for excitation is not supplied to the X coils 233 at both end parts in the X direction and the Y coils 234 at both end parts in the Y direction. Even though such a configuration is employed, because the longer side 233a of the X coil 233 is formed across the whole length of the sensor substrate 230 along the Y direction, a magnetic field can be generated also in the area A with the same intensity as that in the area C by making the transmission current for excitation flow through the X coil 233. Similarly, because the longer side 234a of the Y coil 234 is formed across the whole length of the sensor substrate 230 along the X direction, a magnetic field can be generated also in the area B with the same intensity as that in the area C by making the transmission current for excitation flow through the Y coil 234.

However, the transmission current for excitation is supplied to neither the X coil 233 nor the Y coil 234 in the areas D at four corners in FIG. 7, and thus the magnetic field in these areas D is weak.

So, in this embodiment, the auxiliary coil 235 is provided in order to generate a magnetic field with intensity that is high enough to detect the position indicated by the position indicator 1 in the area D. Specifically, four auxiliary coils 235-1 to 235-4 shown in FIG. 5 are provided corresponding to the areas D at four corners in FIG. 7, respectively. In the example shown in FIG. 5, each of the auxiliary coils 235-1 to 235-4 is a rectangular loop coil surrounding the area D.

[Size and Shape of Auxiliary Coil 235]

The amount of unnecessary radiation of leaking magnetic flux from the sensor substrate 230 due to a loop coil depends on the length of the closest part of this loop coil to the end part of the sensor substrate 230. The end parts 233b and 234b of the X coil 233 and the Y coil 234 are shorter than the longer sides 233a and 234a of the X coil 233 and the Y coil 234. Therefore, the amount of unnecessary radiation of leaking magnetic flux by the X coil 233 and the Y coil 234 depends on the longer sides 233a and 234a of them.

On the other hand, the auxiliary coil 235 of this example is provided at four corners of the sensor substrate 230 and therefore two sides of the auxiliary coil 235 are the closest to the X-direction end part and the Y-direction end part of the sensor substrate 230. Consequently, the amount of unnecessary radiation of leaking magnetic flux by the auxiliary coil 235 depends on the sum of the lengths of two sides of the auxiliary coil 235 closest to the X-direction end part and the Y-direction end part of the sensor substrate 230.

The amount of unnecessary radiation of leaking magnetic flux by the auxiliary coil 235 needs to be smaller than that of unnecessary radiation of leaking magnetic flux by the loop coil whose longer side (233a, 234a) is shorter, of the X coil 233 and the Y coil 234.

In this example, the longer side of the X coil 233 is shorter than that of the Y coil 234. Therefore, the sum of the lengths of two sides of the auxiliary coil 235 closest to the X-direction end part and the Y-direction end part of the sensor substrate 230 needs to be smaller than the length of the longer side 233a of the X coil 233.

Figure 8:
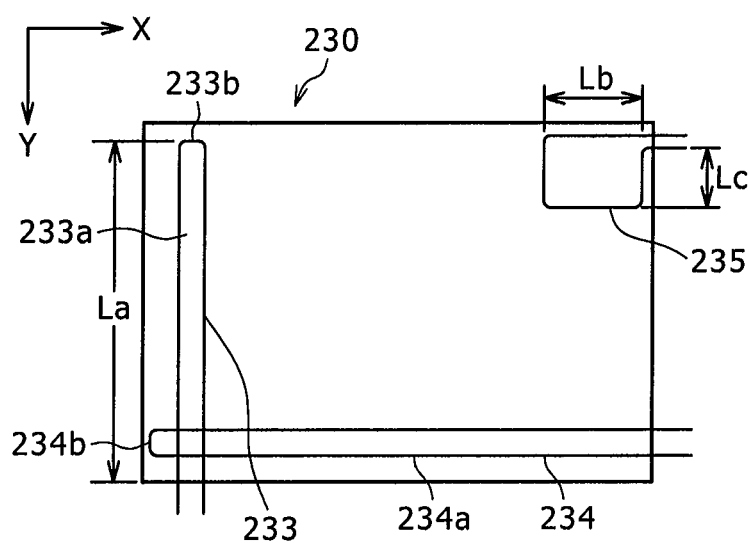
FIG. 8 is a diagram for explaining the shape and size of the auxiliary coil used in the position detecting device of the embodiment of this invention.

Specifically, as shown in FIG. 8, when the length of the longer side 233a of the X coil 233 is defined as La and the lengths of two sides of the auxiliary coil 235 closest to the X-direction end part and the Y-direction end part of the sensor substrate 230 are defined as Lb and Lc, respectively, the size and shape of the auxiliary coil 235 are so decided as to satisfy at least the following expression.

$$Lb+Lc<La \qquad \text{(Equation 1)}$$

The shape of the respective auxiliary coils 235-1 to 235-4 may be any as long as they can generate magnetic flux that allows supply of an induced magnetic field with proper intensity to the position indicator 1 above the area D. Thus, the shape is not limited to a rectangular shape like that shown in this example and may be a polygonal shape or a circular shape.

Figure 9A:
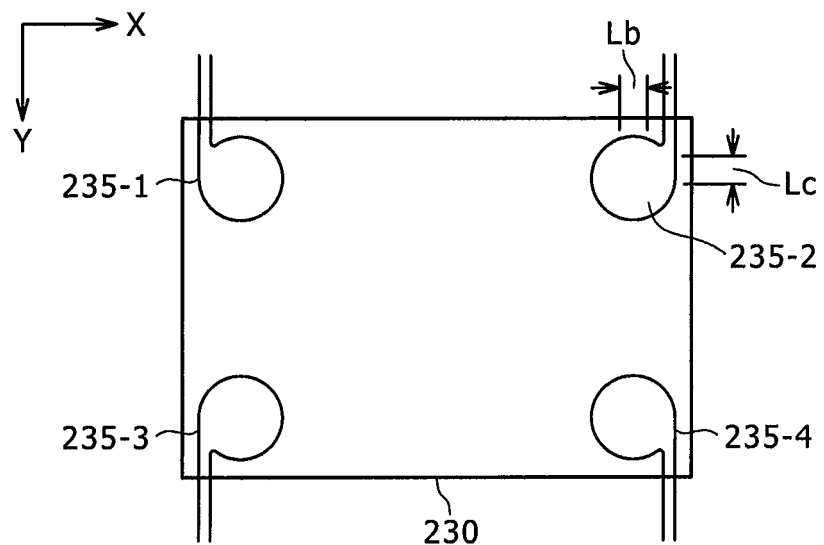
FIGS. 9A and 9B are diagrams showing examples of the shape and size of the auxiliary coil used in the position detecting device of some embodiments of this invention.

For example, as shown in FIG. 9A, each of the auxiliary coils 235-1 to 235-4 at four corners may have a circular shape. If the loop coil has a circular shape, the length of the closest part of the auxiliary coil 235 to the X-direction end part and the Y-direction end part of the sensor substrate 230 is small as shown in FIG. 9A.

Figure 9B:
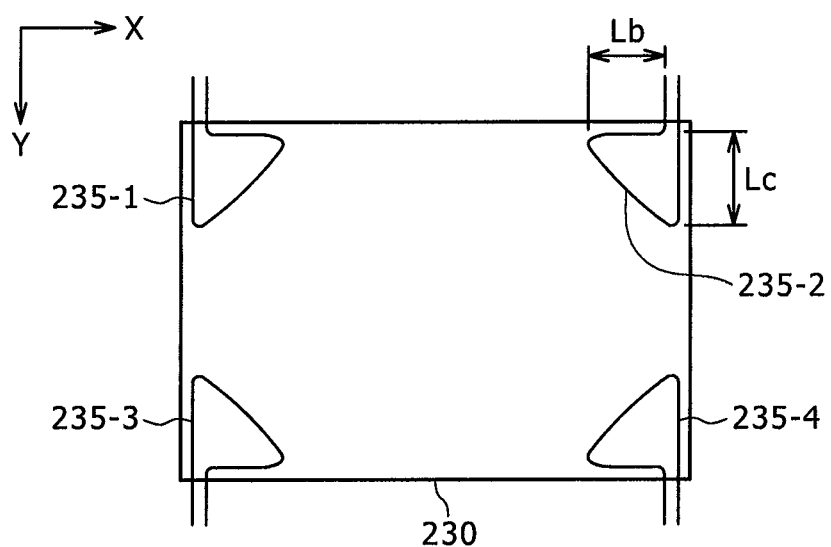

Alternatively, as shown in FIG. 9B, each of the auxiliary coils 235-1 to 235-4 at four corners may have a triangular shape.

It is enough for the auxiliary coil 235 to be capable of generating magnetic flux that allows supply of a sufficient induced magnetic field to the position indicator 1 that indicates a position above the area D. Therefore, the size of this auxiliary coil may be larger than that of the area D or may be smaller.

Although all of the auxiliary coils 235 are a one-turn loop coil in the above-described examples, it is obvious that they may be a plural-turn loop coil.

[Setting of Transmission and Reception of Loop Coil in Respective Areas of Sensor Substrate 230]

In the position detecting device of this embodiment, for each of the area A, the area B, the area C, and the area D shown in FIG. 7, the loop coil to which the transmission current for excitation is supplied (i.e., a transmitting coil) is set and the loop coil that receives the reception current generated due to electromagnetic induction coupling with the position indicator 1 (i.e., a receiving coil) is set.

FIG. 10 shows an example of the transmitting coil and the receiving coil set for each of the area A, the area B, the area C, and the area D. In this case, the receiving coil is the same for all of the area A, the area B, the area C, and the area D. Specifically, the X coil 233 is used as the coil for detecting the X coordinate and the Y coil 234 is used as the coil for detecting the Y coordinate.

However, the transmitting coil differs for each of the area A, the area B, the area C, and the area D. Specifically, for the area A, the plural X coils 233 existing in the area distant from both ends of the sensor substrate 230 in the X direction by the distance dx or longer can be used as the transmitting coils for detecting the X coordinate and the Y coordinate because the longer side 233a of the X coil 233 is extended to the areas A.

For the area B, the plural Y coils 234 distant from both ends of the sensor substrate 230 in the Y direction by the distance dy or longer can be used as the transmitting coils for detecting the X coordinate and the Y coordinate because the longer side 234a of the Y coil 234 is extended to the areas B.

For the area C, both of the X coil 233 and the Y coil 234 can be used as the transmitting coils because the problem of unnecessary radiation of leaking magnetic flux does not occur in the area C. Therefore, for the area C, either one of the X coil 233 and the Y coil 234 can be used as each of the transmitting coils for detecting the X coordinate and the Y coordinate.

For the area D, neither the X coil 233 nor the Y coil 234 is used as the transmitting coil because both coils cause unnecessary radiation of leaking magnetic flux. Instead, the auxiliary coil 235 is used as the transmitting coils for detecting the X coordinate and the Y coordinate for this area D.

[Configuration Example of Signal Processor 25]

Figure 11:
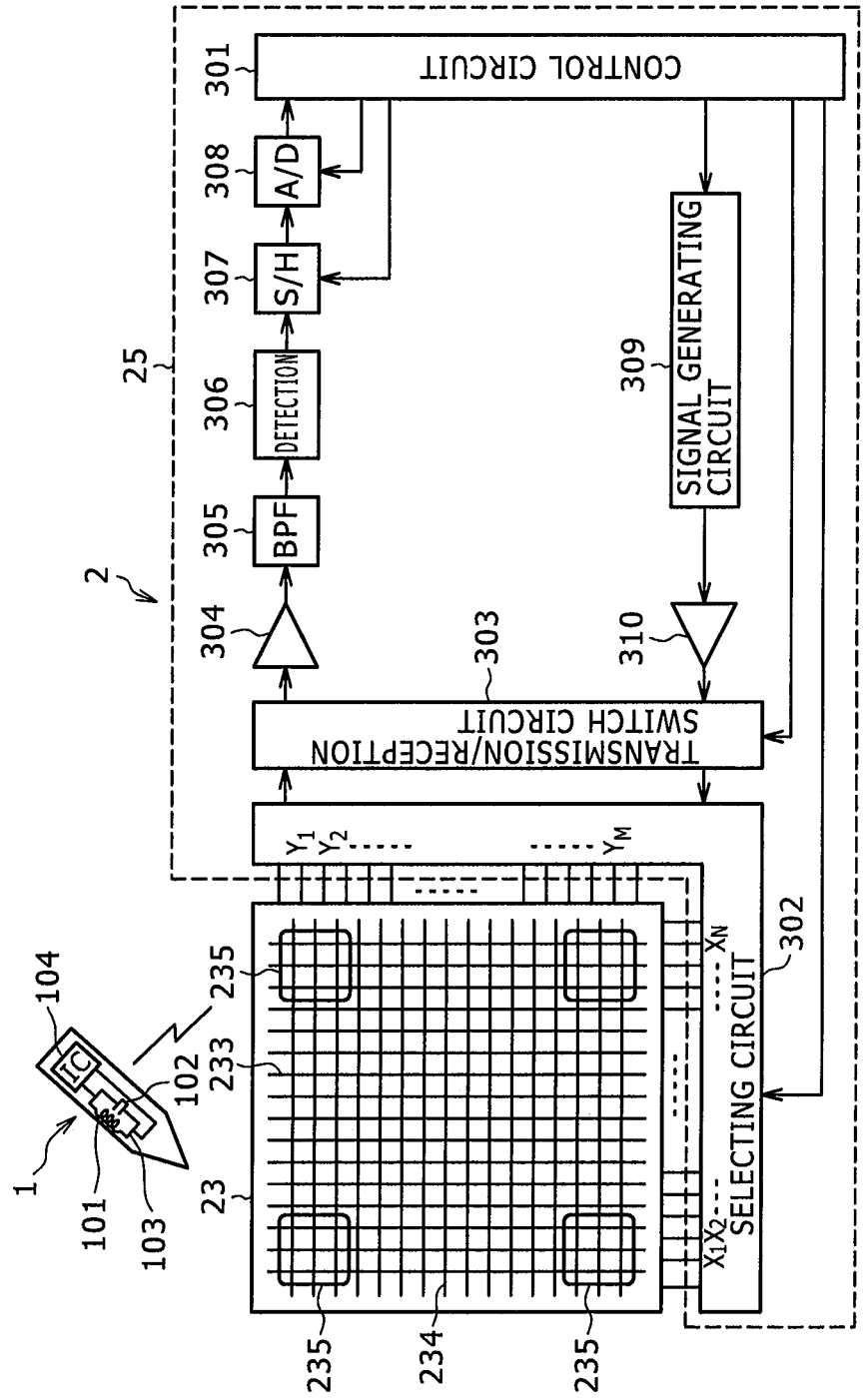
FIG. 11 is a block diagram showing a configuration example of a signal processor in the position detecting device of the embodiment of this invention.

FIG. 11 is a diagram showing a configuration example of the signal processor 25. In FIG. 11, the connection relationship between the signal processor 25 and the sensor unit 23 is also shown. However, in FIG. 11, the X coils 233 and the Y coils 234 of the sensor unit 23 are schematically represented as straight lines and the auxiliary coils 235 are represented as rectangles. As shown in FIG. 11, the signal processor 25 is connected to the X coils 233, the Y coils 234, and the auxiliary coils 235 included in the sensor unit 23. For convenience of understanding, the position indicator 1 is also shown in FIG. 11.

The position indicator 1 has a resonant circuit 103 including a coil 101 and a capacitor 102, and an integrated circuit (IC) 104. The resonant circuit 103 is connected to the IC 104. The position indicator may have a simple structure that is not controlled by the IC.

The signal processor 25 includes a control circuit 301, a selecting circuit 302, a transmission/reception switch circuit 303, an amplifier circuit 304, a band-pass filter 305, a detection circuit 306, a sample hold circuit 307, an analog-to-digital (A/D) conversion circuit 308, a signal generating circuit 309, and an amplifier circuit 310.

The control circuit 301 includes, for example, a microcomputer and executes control processing for the respective necessary units in this signal processor 25.

The selecting circuit 302 is connected to each of the plural loop coils composed of N X coils 233, M Y coils 234, and four auxiliary coils 235 included in the sensor unit 23, and selects one loop coil from these plural loop coils in accordance with a control command from the control circuit 301.

The transmission/reception switch circuit 303 switches the operation mode between the transmission mode in which a signal is sent out to the loop coil selected by the selecting circuit 302 and the reception mode in which a signal from the position indicator 1 is received by the loop coil selected by the selecting circuit 302, in accordance with a control command from the control circuit 301.

The amplifier circuit 304 amplifies a signal output from the transmission/reception switch circuit 303 and outputs the amplified signal to the band-pass filter 305. For the signal amplified by the amplifier circuit 304, the band-pass filter 305 allows the passage of only the signal component in a predetermined frequency band and outputs the signal component to the detection circuit 306. The detection circuit 306 converts the signal component that has passed through the band-pass filter 305 to a voltage value and outputs the voltage value to the sample hold circuit 307.

The sample hold circuit 307 holds the voltage value from the detection circuit 306 at a predetermined timing, specifically at a predetermined timing in the reception mode, based on a clock signal for sample hold from the control circuit 301, and sends out the voltage value to the A/D conversion circuit 308. The A/D conversion circuit 308 converts the analog output of the sample hold circuit 307 to a digital signal and outputs the digital signal to the control circuit 301.

The signal generating circuit 309 generates an AC signal of a predetermined frequency and supplies the AC signal to the amplifier circuit 310 in accordance with control by the control circuit 301. The amplifier circuit 310 amplifies the AC signal from the signal generating circuit 309 and converts the AC signal to a current to send out the current to the transmission/reception switch circuit 303. The transmission/reception switch circuit 303 supplies this current from the amplifier circuit 310 to the loop coil selected by the selecting circuit 302.

The signal processor 25 detects position input operation by the position indicator 1 in the following manner.

First, the control circuit 301 controls the selecting circuit 302 to make it select one loop coil. In addition, the control circuit 301 controls the transmission/reception switch circuit 303 to make it switch the operation mode to the transmission mode.

Subsequently, the control circuit 301 controls the signal generating circuit 309 to make it generate an AC signal of a predetermined frequency. This AC signal is amplified by the amplifier circuit 310 and input to the selecting circuit 302 via the transmission/reception switch circuit 303. In this manner, the current dependent on this AC signal flows through the loop coil selected by the selecting circuit 302 and a magnetic field (alternating magnetic field) interlinked with this loop coil is generated.

In the position indicator 1 located near the sensor unit 23, an induced current is induced in its resonant circuit 103 due to the magnetic field generated by this loop coil, and the IC 104 starts operation based on this induced current. The IC 104 makes the resonant circuit 103 generate a signal of a predetermined frequency and transmits this signal of the predetermined frequency from the resonant circuit 103 to the sensor unit 23.

After continuing the operation of the above-described transmission mode for a predetermined time, the control circuit 301 controls the transmission/reception switch circuit 303 to switch the operation mode to the reception mode. This switching stops the input of the signal from the signal generating circuit 309 to the selecting circuit 302. In the case of changing the loop coil selected in the reception mode to a loop coil different from the loop coil selected in the immediately-previous transmission mode, the control circuit 301 sends a command of the change control to the selecting circuit 302 to control the selecting circuit 302 so that the selected loop coil may be changed. If the same loop coil as that selected in the immediately-previous transmission mode is used in the reception mode, the control circuit 301 does not carry out this change control of the loop coil.

In this reception mode, a signal transmitted from the position indicator 1 by the operation of the IC 104 is received by the loop coil selected by the selecting circuit 302. Specifically, a signal current flows through the resonant circuit 103 in the position indicator 1 and whereby a magnetic field is generated around this resonant circuit 103. Due to this magnetic field, an induced current flows through the loop coil near the position indicator 1 among the plural loop coils of the sensor unit 23. The induced current flowing through the loop coil selected by the selecting circuit 302 is supplied to the amplifier circuit 304 via the transmission/reception switch circuit 303 and amplified therein.

The output signal from this amplifier circuit 304 is supplied to the band-pass filter 305 and subjected to band limiting, and a component in a predetermined frequency band from this band-pass filter 305 is input to the detection circuit 306. This component is converted to a voltage value by the detection circuit 306 and held by the sample hold circuit 307. The voltage value held by the sample hold circuit 307 is converted to digital data by the A/D conversion circuit 308 and output to the control circuit 301.

The control circuit 301 temporarily stores the digital data from the A/D conversion circuit in a buffer memory. Subsequently, the control circuit 301 changes the receiving coil by selection control of the loop coil in the selecting circuit 302, and captures the digital data input from the A/D conversion circuit 308 in the reception mode with this receiving coil to temporarily store the digital data in the buffer memory.

Subsequently, the control circuit 301 executes calculation processing of the digital data about the respective loop coils, temporarily stored in the buffer memory, to thereby specify the loop coil close to the position indicated and input by the position indicator 1 and obtain the coordinates of the position indicated by the position indicator 1.

The position indicator 1 includes a core (rod) for sensing the writing pressure and has a mechanism to vary the inductance of the coil 101 or the capacitance of the capacitor 102 depending on the writing pressure applied to this core (rod), although not illustrated in FIG. 11 (see, for example, Japanese Patent Laid-Open No. Hei 4-96212). In the position indicator 1, the resonant frequency of the resonant circuit 103 changes in linkage with change in the writing pressure.

The control circuit 301 detects this change in the resonant frequency (phase change) by executing calculation processing of the digital data from the A/D conversion circuit 308, and senses also the writing pressure applied to the position indicator 1.

[Selection Control of Loop Coil]

A description will be made below about one example of the selection control of the loop coil by the control circuit 301 until detection of the position indicated by the position indicator 1. In the example described below, first, the control circuit 301 sequentially searches the X coils or the Y coils skippingly and carries out rough detection of the indicated position (hereinafter referred to as a global scan). Subsequently, the control circuit 301 sequentially searches, one coil by one coil, the X coils or the Y coils in the vicinity area of the loop coil from which a significant reception result is obtained in the global scan and carries out refined detection of the indicated position (hereinafter referred to as a sector scan). Furthermore, in this embodiment, position detection in the areas at four corners by use of the auxiliary coil 235 as the transmitting coil is carried out. Also for these areas at four corners, the control circuit 301 carries out rough detection of the indicated position (hereinafter, referred to as a rough corner scan) and refined detection of the indicated position (hereinafter referred to as a refined corner scan).

Figure 12:
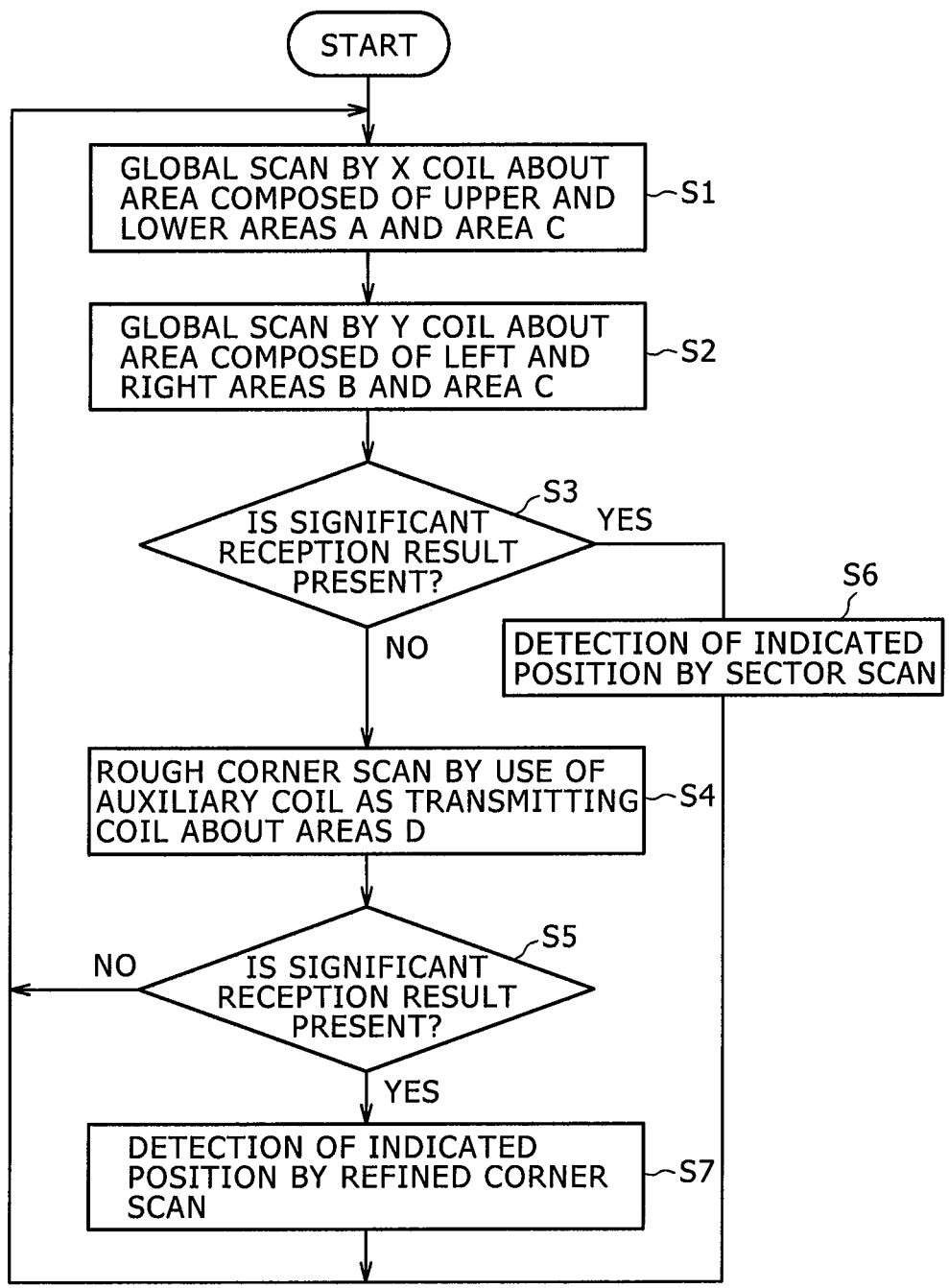
FIG. 12 is a flowchart for explaining one example of the flow of processing of detecting the position indicated by a position indicator in the position detecting device of the embodiment of this invention.

FIG. 12 is a flowchart showing one example of the flow of processing of detecting the indicated position by the control circuit 301.

In this example, first, about the area composed of the areas A (upper and lower areas A) at both peripheral parts of the sensor substrate 230 in the Y direction and the area C, the control circuit 301 carries out a global scan by using the X coils 233 existing in this area as the transmitting/receiving loop coil (step S1).

Specifically, the control circuit 301 makes the selecting circuit 302 select the X coil 233, e.g. the X coil 233-$k$, at a position distant from one end part of the sensor substrate 230 in the X direction, for example, the left end, by the distance dx or longer as the first loop coil in the global scan of this step S1. k is an integer equal to or larger than {(the number of X coils 233 within the distance dx from the end part of the sensor substrate 230 in the X direction)+1}. k' to be described later is also a similar integer. Furthermore, the control circuit 301 switches the transmission/reception switch circuit 303 to the transmission mode and makes the signal current from the signal generating circuit 309 flow through this X coil 233-$k$.

Next, upon the elapse of a predetermined time, the control circuit 301 switches the transmission/reception switch circuit 303 to the reception mode. In this reception mode, the control circuit 301 captures, by the sample hold circuit 307, the induced current flowing through the X coil 233-$k$ depending on the magnetic field from the position indicator 1, and receives the digital data thereof from the A/D conversion circuit 308. Subsequently, the control circuit 301 temporarily stores the captured digital data in the buffer memory as the reception result about the X coil 233-$k$ in this reception mode.

After the transmission and reception modes about the X coil 233-$k$ are completed in the above-described manner, the control circuit 301 controls the selecting circuit 302 so that the selecting circuit 302 may select the second or n-th adjacent (n is an integer equal to or larger than three) X coil 233, for example, the fourth adjacent X coil 233-($k$+4). Subsequently, the control circuit 301 repeats the above-described transmission mode and reception mode about the newly-selected transmitting/receiving X coil 233-($k$+4). Also in the subsequent operation in this example, similarly, the control circuit 301 switches the transmitting/receiving X coil to every fourth X coil 233-($k$+8), 233-($k$+12), ... sequentially until the X coil 233-(N−k') at a position distant from the right end of the sensor substrate 230 by dx or longer is selected, and repeats the above-described transmission mode and reception mode about each selected transmitting/receiving X coil.

After the global scan in the step S1 is completed in the above-described manner, in this example, next for the area composed of the areas B (left and right areas B) at both peripheral parts of the sensor substrate 230 in the X direction and the area C, the control circuit 301 carries out a global scan by using the Y coils 234 existing in this area as the transmitting/receiving loop coil (step S2).

Specifically, the control circuit 301 makes the selecting circuit 302 select the Y coil 234, for example, the Y coil 234-$p$, at a position distant from one end part of the sensor substrate 230 in the Y direction, for example, the upper end of the sensor substrate 230, by the distance dy or longer as the first loop coil in the global scan of this step S2. p is an integer equal to or larger than {(the number of Y coils 234 within the distance dy from the end part of the sensor substrate 230 in the Y direction)+1}. p' to be described later is also a similar integer. Furthermore, the control circuit 301 switches the transmission/reception switch circuit 303 to the transmission mode and makes the signal current from the signal generating circuit 309 flow through this Y coil 234-$p$.

Next, upon the elapse of a predetermined time, the control circuit 301 switches the transmission/reception switch circuit 303 to the reception mode. In this reception mode, the control circuit 301 holds, by the sample hold circuit 307, the induced current flowing through the Y coil 234-$p$ depending on the magnetic field from the position indicator 1, and receives the digital data thereof from the A/D conversion circuit 308. Subsequently, the control circuit 301 temporarily stores the received digital data in the buffer memory as the reception result about the Y coil 234-$p$ selected in this reception mode.

After the transmission and reception modes about the Y coil 234-$p$ are completed in the above-described manner, the control circuit 301 controls the selecting circuit 302 so that the selecting circuit 302 may select the second or n-th adjacent (n is an integer equal to or larger than three) Y coil 234, for example, the fourth adjacent Y coil 234-($p$+4). Subsequently, the control circuit 301 repeats the above-described transmission mode and reception mode about the newly-selected transmitting/receiving Y coil 234-($p$+4). Also in the subsequent operation in this example, similarly, the control circuit 301 switches the transmitting/receiving Y coil to every fourth Y coil 234-($p$+8), 234-($p$+12), . . . sequentially until the Y coil 234-(M–p') at a position distant from the lower end of the sensor substrate 230 by dy or longer is selected, and repeats the above-described transmission mode and reception mode about each selected transmitting/receiving Y coil.

After the global scan in the step S2 is completed in the above-described manner, the control circuit 301 refers to the reception results about the respective X coils 233, temporarily stored in the global scan of the step S1, and the reception results about the respective Y coils 234, temporarily stored in the global scan of the step S2, and determines whether or not the reception result indicating a significant value is present (step S3).

If the control circuit 301 determines that the reception result indicating a significant value does not exist in this step S3, the control circuit 301 carries out rough corner scan by use of the auxiliary coil 235 as the transmitting coil about the areas D at four corners of the sensor substrate 230 (step S4).

Specifically, in this step S4, the control circuit 301 makes the selecting circuit 302 select, for example, the auxiliary coil 235-1 at the upper left corner as the first loop coil in the rough corner scan of this step S4. Subsequently, the control circuit 301 switches the transmission/reception switch circuit 303 to the transmission mode and makes the signal current from the signal generating circuit 309 flow through this auxiliary coil 235-1.

Next, upon the elapse of a predetermined time, the control circuit 301 switches the transmission/reception switch circuit 303 to the reception mode, and controls the selecting circuit 302 so that the selecting circuit 302 may select one X coil 233 or Y coil 234 passing through the area D at this upper left corner. Furthermore, in this reception mode, the control circuit 301 holds, by the sample hold circuit 307, the induced current flowing through the X coil 233 or the Y coil 234 selected by the selecting circuit 302 depending on the magnetic field from the position indicator 1, and receives the digital data thereof from the A/D conversion circuit 308. Subsequently, the control circuit 301 temporarily stores the received digital data in the buffer memory as the reception result about the X coil 233 or the Y coil 234 selected in this reception mode.

In the rough corner scan of this step S4, after the end of the reception mode, the control circuit 301 controls the selecting circuit 302 so that the selecting circuit 302 may select the auxiliary coil 235-1 again, and carries out the above-described transmission mode. After the end of the transmission mode, the control circuit 301 controls the selecting circuit 302 so that the selecting circuit 302 may select one different X coil 233 or Y coil 234 passing through the area D at this upper left corner, and carries out the above-described reception mode.

After repeating the transmission and reception modes in which the auxiliary coil 235-1 is selected as the transmitting coil and a respective one of the different X coils 233 or Y coils 234 passing through the area D at the upper left corner is selected as the receiving coil, the control circuit 301 carries out rough corner scan about, for example, the area D at the upper right corner. Specifically, the control circuit 301 carries out control to repeat the transmission and reception modes in which the auxiliary coil 235-2 is selected as the transmitting coil and a respective one of the different X coils 233 or Y coils 234 passing through the area D at the upper right corner is selected as the receiving coil.

After the end of the rough corner scan about the area D at this upper right corner, about the area D at the lower left corner, the control circuit 301 carries out a rough corner scan of repeating the transmission and reception modes in which the auxiliary coil 235-3 is selected as the transmitting coil and a respective one of the different X coils 233 or Y coils 234 passing through the area D at the lower left corner is selected as the receiving coil.

Moreover, after the end of the rough corner scan about the area D at this lower left corner, about the area D at the lower right corner, the control circuit 301 carries out a rough corner scan of repeating the transmission and reception modes in which the auxiliary coil 235-4 is selected as the transmitting coil and a respective one of the different X coils 233 or Y coils 234 passing through the area D at the lower right corner is selected as the receiving coil. Through the above-described process, the rough corner scan of this step S4 is completed.

In the above description, in the rough corner scan of the step S4, the transmission mode and the reception mode are repeated plural times with switching of the receiving coil for each of the areas D at four corners. However, because the size of the area D is comparatively small, it is also possible that, in the rough corner scan of the step S4, only one set of the transmission mode and the reception mode is carried out for each area D instead of the multiple repetition of these modes.

After the rough corner scan in the step S4 is completed in the above-described manner, the control circuit 301 refers to the reception results about the respective X coils 233 or Y coils 234, temporarily stored in the buffer memory, and determines whether or not the reception result indicating a significant value is present (step S5).

If the control circuit 301 determines that the reception result indicating a significant value does not exist in this step S5, the control circuit 301 returns to the step S1 and repeats the processing of this step S1 and the subsequent steps.

On the other hand, if the control circuit 301 determines that the reception result indicating a significant value exists in the step S3, the control circuit 301 determines the X coil 233 and/or the Y coil 234 whose reception result indicates the significant value to thereby determine the area for which a sector scan should be carried out and carry out the sector scan (step S6).

When the loop coils whose reception result indicates a significant value are both of the X coil 233 and the Y coil 234, at least the area C is included in the area for which a sector scan should be carried out.

If the reception results of both of the X coil 233 and the Y coil 234 indicate a significant value and the X coil 233 whose reception result indicates a significant value is near one of the areas B, the control circuit 301 determines that the area including the area C and this one area B is the area for which a sector scan should be carried out. In the area B, the Y coil 234 should be selected as the transmitting coil as shown in FIG. 10. Thus, the control circuit 301 carries out a sector scan in the determined area in such a manner that only the Y coil 234 is selected as the transmitting coil and the X coil 233 and the Y coil 234 are switched as the receiving coil, to thereby detect the position indicated by the above-described position indicator 1.

If the reception results of both of the X coil 233 and the Y coil 234 indicate a significant value and the Y coil 234 whose reception result indicates a significant value is near one of the areas A, the control circuit 301 determines that the area including the area C and this one area A is the area for which a sector scan should be carried out. In the area A, the X coil 233 should be selected as the transmitting coil as shown in FIG. 10. Thus, the control circuit 301 carries out a sector scan in the determined area in such a manner that only the X coil 233 is selected as the transmitting coil and the X coil 233 and the Y coil 234 are switched as the receiving coil, to thereby detect the position indicated by the above-described position indicator 1.

If the reception results of both of the X coil 233 and the Y coil 234 indicate a significant value and the X coil 233 showing the determination result that its reception result is a significant value is near one of the areas B and the Y coil 234 showing the determination result that its reception result is a significant value is near one of the areas A adjacent to this one area B, the control circuit 301 determines that the area including the area D adjacent to both of this one area B and this one area A is the area for which a sector scan should be carried out. In the area D, the auxiliary coil 235 should be selected as the transmitting coil as shown in FIG. 10. Thus, the control circuit 301 carries out a sector scan in the determined area in such a manner that only the auxiliary coil 235 is selected as the transmitting coil and the X coil 233 and the Y coil 234 are switched as the receiving coil, to thereby detect the position indicated by the above-described position indicator 1.

Moreover, if the reception results of both of the X coil 233 and the Y coil 234 indicate a significant value and a state other than the above-described states is obtained regarding the position of the coil whose reception result indicates a significant value, the control circuit 301 determines that only the area C is the area for which a sector scan should be carried out. In the area C, there is no limit to the transmitting coil and both of the X coil 233 and the Y coil 234 can be used as the transmitting coil as shown in FIG. 10. Thus, for the determined area, the control circuit 301 first carries out the transmission and reception modes about each X coil 233 and thereafter carries out the transmission and reception modes about each Y coil 234, for example. Subsequently, the control circuit 301 creates and outputs the position data of the position indicator 1 based on the temporarily-stored reception results of the respective X coils 233 and the respective Y coils 234.

After the end of this step S6, the control circuit 301 returns to the step S1 and repeats the processing of this step S1 and the subsequent steps.

If the control circuit 301 determines that the reception result indicating a significant value exists in the step S5, the control circuit 301 determines the X coil 233 and/or the Y coil 234 whose reception result indicates a significant value to thereby determine the area for which a refined corner scan should be carried out and carry out the refined corner scan (step S7). At this time, first, either one of the areas D at four corners is determined, and then the area for which a refined corner scan is carried out is further determined for this determined one area D. It is also possible to determine that the whole area of the determined area D is the area for which a refined corner scan should be carried out.

In the refined corner scan in this step S7, the auxiliary coil is always selected as the transmitting coil and the receiving coil is switched to the X coil 233 and the Y coil 234. Subsequently, the control circuit 301 creates and outputs the position data of the position indicator 1 based on the reception results of the respective X coils 233 and the respective Y coils 234, temporarily stored in the buffer memory.

The above-described selection control of the loop coil is one example and the selection control is not limited thereto. For example, the global scan of the step S2 in the above-described example may be carried out earlier than the global scan of the step S1.

In the above-described example, the shift to a sector scan is allowed after the global scan of the step S1 and the global scan of the step S2 are carried out. However, the following way is also possible. Specifically, after the global scan of the step S1 and the step S2 and the rough corner scan of the step S4 are sequentially carried out, the area for which a sector scan or a refined corner scan is carried out is decided by comprehensively determining the reception results of the respective X coils 233 and the respective Y coils 234, temporarily stored in the global scan and the rough corner scan of these steps, and the sector scan or the refined corner scan is carried out.

The rough corner scan of the step S4 may be carried out before the global scan of the step S1 or the global scan of the step S2. Alternatively, the rough corner scan of the step S4 may be carried out in the middle of the global scan of the step S1 or the global scan of the step S2.

The above-described example employs the method of combining a global scan and a sector scan and combining a rough corner scan and a refined corner scan. However, it is also possible to carry out detection of the indicated position by sequentially switching the loop coil, without carrying out the global scan and the rough corner scan. In this case also, it is obvious that the transmitting coil that can be used for the respective areas shown in FIG. 10 needs to be carefully selected.

[Other Configuration Examples of Sensor Unit 23]

In the sensor unit 23 of the position detecting device 2 of the above-described embodiment, the auxiliary coils are provided in the middle of the two-layer printed wiring board as shown in FIG. 4 and FIG. 5. However, the configuration of the sensor unit 23 is not limited to the above-described example.

Figure 13:
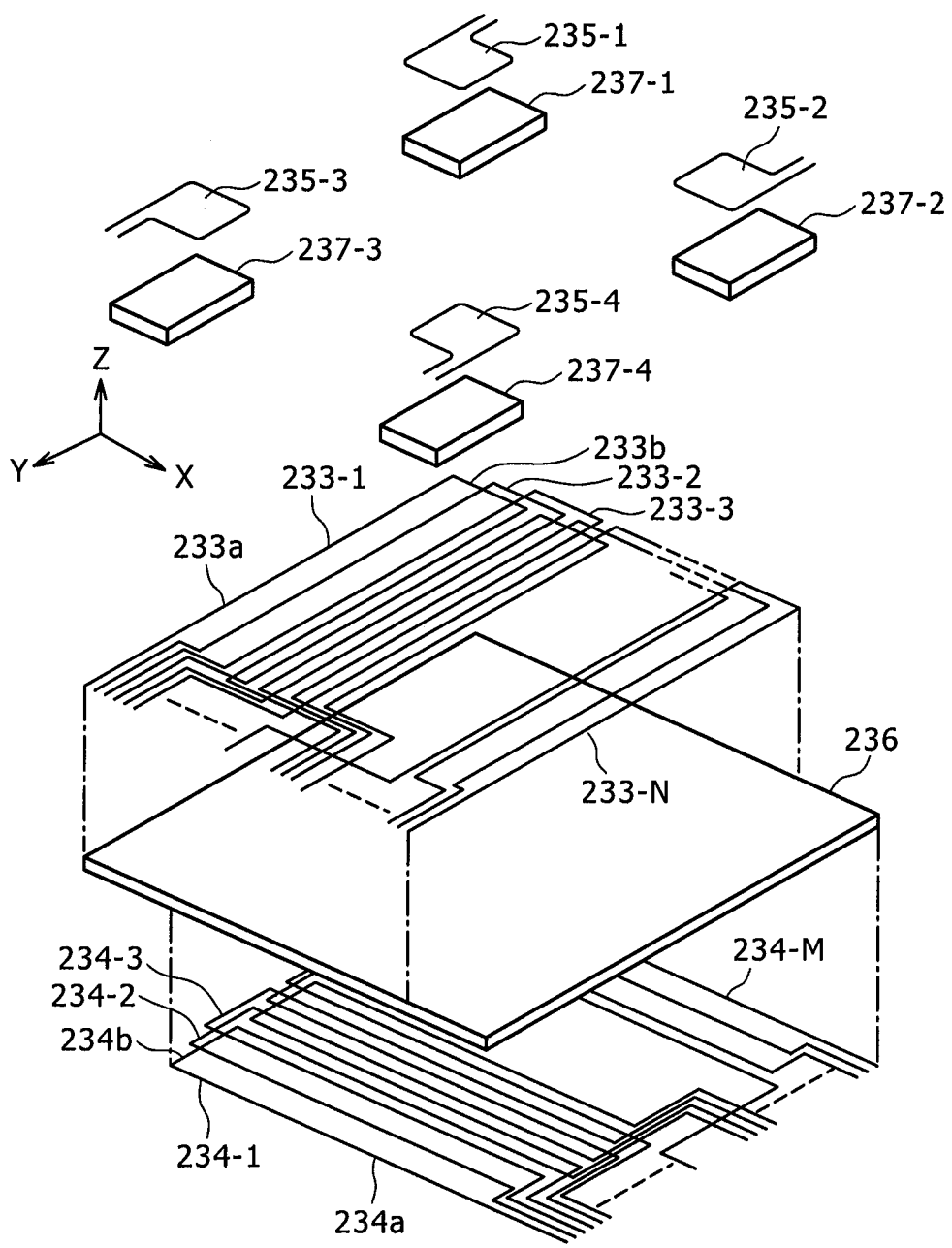
FIG. 13 is a diagram for explaining another configuration example of the sensor unit used in the position detecting device of the embodiment of this invention.

FIG. 13 shows one of other configuration examples of the sensor unit 23. In this example, plural X coils 233-1, 233-2, . . . 233-N are formed from a printed pattern of one or plural layers on the front surface side of one double-sided printed wiring board 236, and plural Y coils 234-1, 234-2, . . . 234-M are formed from a printed pattern of one or plural layers on the back surface side of this printed wiring board 236.

Furthermore, in this example, the auxiliary coils 235-1, 235-2, 235-3, and 235-4 are formed from a printed pattern on the surfaces of small printed wiring boards 237-1, 237-2, 237-3, and 237-4, respectively. In addition, four small printed wiring boards 237-1, 237-2, 237-3, and 237-4 on which the auxiliary coils 235-1, 235-2, 235-3, and 235-4 are formed are bonded to four corners of the double-sided printed wiring board 236.

Figure 14A:
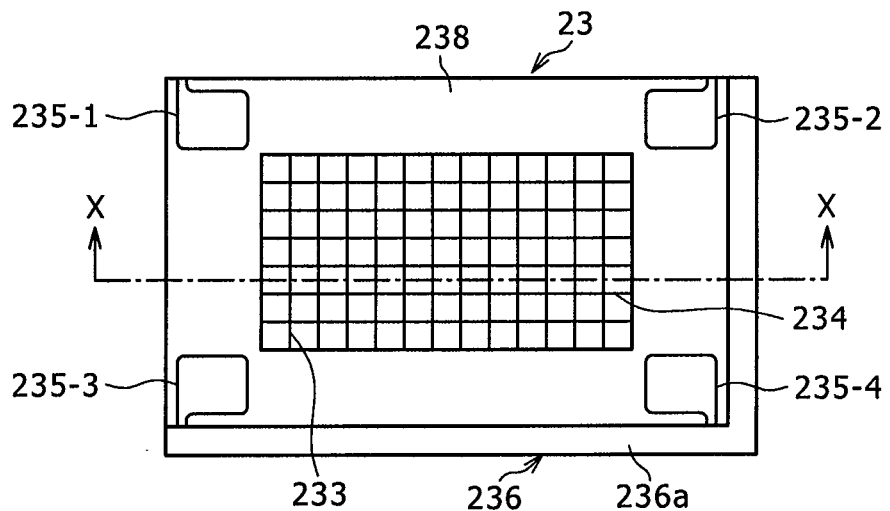
FIGS. 14A and 14B are diagrams for explaining another configuration example of the sensor unit used in the position detecting device of an embodiment of this invention.
Figure 14B:
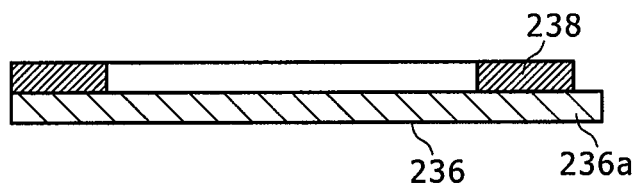

Instead of four small printed wiring boards, a printed wiring board having a frame shape corresponding to the peripheral part of the double-sided printed wiring board 236 may be used. FIGS. 14A and 14B are diagrams showing a configuration example of the sensor unit 23 of this case. FIG. 14A is a plan view of the sensor unit 23 of this example, and FIG. 14B is a sectional view along line X-X in FIG. 14A.

As shown in FIGS. 14A and 14B, the sensor unit 23 of this example includes the double-sided printed wiring board 236 having the plural X coils 233 on its front surface and the plural Y coils 234 on its back surface. Furthermore, a printed wiring board 238 having a frame shape corresponding to the peripheral part of the sensor unit 23 is bonded onto, for example, the front surface of this double-sided printed wiring board 236. At four corners of this printed wiring board 238 having the frame shape, the auxiliary coils 235-1, 235-2, 235-3, and 235-4 are formed from a printed pattern.

In FIGS. 14A and 14B, the part of the double-sided printed wiring board 236 protruding toward the outside from the printed wiring board 238 having the frame shape corresponds to the part at which lead terminals of the X coils 233 and the Y coils 234 are provided.

Figure 15:
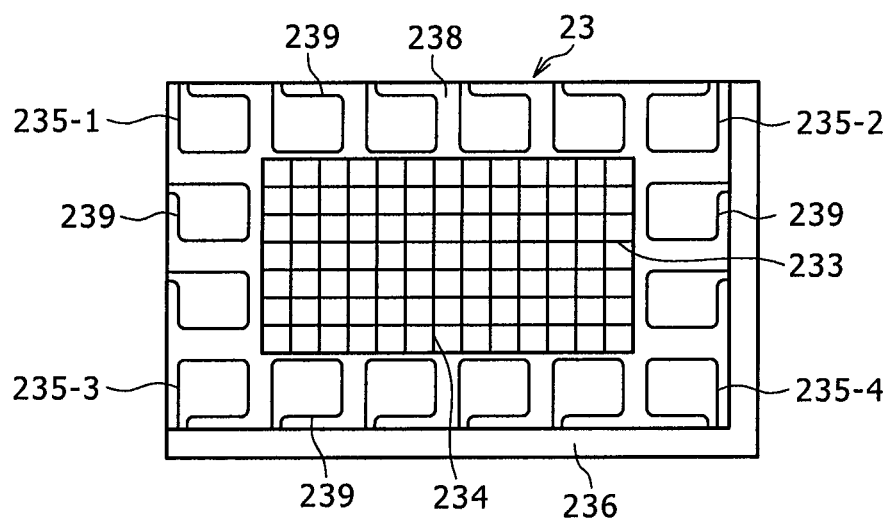
FIG. 15 is a diagram for explaining another configuration example of the sensor unit used in the position detecting device of an embodiment of this invention.

In the above-described embodiment, the auxiliary coils are provided only in the areas D at four corners of the sensor unit 23. However, the auxiliary coils may be provided also in the areas A and the areas B at the peripheral part of the sensor unit 23. FIG. 15 shows one example of the sensor unit 23 in which the auxiliary coils 235 are provided also in the areas A and the areas B at the peripheral part.

Specifically, the sensor unit of the example of FIG. 15 includes a sensor substrate formed by bonding the printed wiring board 238 having a frame shape onto the surface of the double-sided printed wiring board 236 on which the X coils 233 and the Y coils 234 are formed, similarly to the example of FIGS. 14A and 14B. On the printed wiring board 238 having the frame shape, the auxiliary coils having such shape and size as to satisfy the above-described (Equation 1) are formed.

In the example of FIG. 15, on the printed wiring board 238 having the frame shape, the above-described auxiliary coils 235-1, 235-2, 235-3, and 235-4 are formed in the areas D at four corners of the sensor unit 23. In addition, auxiliary coils 239 having the same shape and size as those of the auxiliary coils 235-1 to 235-4 are formed in the areas A and the areas B at predetermined intervals.

For example, in the above-described embodiment, the X coil 233 is used as the transmitting coil in the area A and the Y coil 234 is used as the transmitting coil in the area B not only in global scan but also in sector scan. In contrast, in the case of the sensor unit of the example of FIG. 15, the auxiliary coil 239 is used as the transmitting coil in sector scan in the area A and the area B.

Specifically, in the sector scan, one of the upper and lower areas A or one of the left and right areas B can be set as the search area. In the example of FIG. 15, the sector scan can be efficiently carried out by using the auxiliary coils 239 provided in the areas A and the areas B as the transmitting coil.

Furthermore, as described above, predetermined circuits (IC and so forth) are often provided around the periphery of the sensor unit 23 and coupling by an induced magnetic field is often weak at the peripheral part of the sensor unit 23 due to the influence of noise from these circuits. For example if a liquid crystal display (LCD) is provided at the part of the position detecting plane, a backlight drive circuit is provided around the periphery of the sensor unit 23.

Therefore, in the related art, the transmission current for excitation needs to be set large if the X coil and the Y coil at the peripheral part of the sensor unit are used as the transmitting coil. This is one of the factors causing the problem of unnecessary radiation of leaking magnetic flux.

However, in the example of FIG. 15, the auxiliary coil 239 smaller in size than the X coil and the Y coil is used as the transmitting coil. Therefore, even when the large transmission current for excitation set in consideration of the influence of external circuits around the sensor unit 23 is made to flow through the auxiliary coil 239, the amount of leakage of magnetic flux is small and can be suppressed to an unproblematic level.

In seeking of the position indicated by the position indicator in the area A and the area B, the auxiliary coil 239 in addition to the X coil 233 and the Y coil 234 may be used in combination, like the above-described example, of course. In such a case, a proper magnetic field designed in consideration of the influence of external circuits around the sensor unit 23 can be generated by the auxiliary coil 239.

The auxiliary coil 239 at the peripheral part of the sensor unit, such as the areas A and the areas B, may be provided only in the area in which the influence of external circuits around the sensor unit 23 is strong, instead of being provided across the entire areas A and the entire areas B as shown in FIG. 15.

Plural auxiliary coils are provided in the sensor unit in the above-described embodiment. However, the number of auxiliary coils may be one.

The invention claimed is:

1. A position detecting device comprising:
 a sensor unit including a plurality of first loop coils that are arranged relative to each other along a first direction and a plurality of second loop coils that are arranged relative to each other along a second direction intersecting with the first direction, the first and second loop coils being configured to both generate a magnetic field to induce an induced current in a coil of a position indicator placed near the first and second loop coils and to receive a signal from the position indicator;
 a yoke sheet provided on a side of the sensor unit that is opposite to a side of the sensor unit that faces a position indicator;
 an auxiliary loop coil provided at a corner part of the sensor unit and configured to only generate a magnetic field to induce an induced current in the coil of the position indicator placed near the auxiliary loop coil;
 a signal transmitter configured to transmit a signal to one or more of the first loop coil, the second loop coil, and the auxiliary loop coil in order to generate a magnetic field therefrom; and
 a controller configured to selectively supply the signal from the signal transmitter to one or more of the first loop coil, the second loop coil, and the auxiliary loop coil to generate a magnetic field therefrom, and to selectively receive the signal from the position indicator via one or more of the first loop coil and the second loop coil.

2. The position detecting device according to claim 1, wherein
the controller is further configured to selectively supply the signal from the signal transmitter to the first loop coils arranged relative to each other along the first direction other than those first loop coils provided at first peripheral parts of the sensor unit at both ends of the first direction, and to selectively supply the signal from the signal transmitter to the second loop coils arranged relative to each other along the second direction other than those second loop coils provided at second peripheral parts of the sensor unit at both ends of the second direction, wherein those first and second loop coils provided at the first and second peripheral parts, respectively, are used only to receive the signal from the position indicator.

3. The position detecting device according to claim 2, wherein
the controller is configured to selectively supply the signal from the signal transmitter to the second loop coils arranged relative to each other along the second direction other than those second loop coils provided at the second peripheral parts to generate a magnetic field relative to the position indicator placed at the first peripheral parts except for portions of the first peripheral parts overlapping with the second peripheral parts, and to selectively supply the signal from the signal transmitter to the first loop coils arranged relative to each other along the first direction other than those first loop coils provided at the first peripheral parts to generate a magnetic field relative to the position indicator placed at the second peripheral parts except for portions of the second peripheral parts overlapping with the first peripheral parts.

4. The position detecting device according to claim 1, wherein
the first loop coil and the second loop coil are each composed of a pair of longer sides and a shorter end part, and one half the length of a coil wire forming the auxiliary loop coil is shorter than any of the longer sides.

5. The position detecting device according to claim 1, wherein
the sensor unit has a quadrangular shape, and
the auxiliary loop coil is disposed at corner parts at four corners of the sensor unit.

6. The position detecting device according to claim 1, wherein
the auxiliary loop coil is disposed at both a corner part and a peripheral part of the sensor unit.

7. The position detecting device according to claim 2, wherein the controller is further configured to:
sequentially supply the signal from the signal transmitter to the first loop coils, starting with the first loop coil provided inside one of the first peripheral parts and moving to adjacent ones of the first loop coils toward the other one of the first peripheral parts,
sequentially supply the signal from the signal transmitter to the second loop coils, starting with the second loop coil provided inside one of the second peripheral parts and moving to adjacent ones of the second loop coils toward the other one of the second peripheral parts, and
supply the signal from the signal transmitter to the auxiliary loop coil.

8. A position input device comprising:
a position indicator including at least one coil; and
a position detecting device including a detecting plane configured to receive indication by the position indicator, the position detecting device being configured to detect a position indicated on the detecting plane by the position indicator, wherein
the position detecting device includes:
a sensor unit including a plurality of first loop coils that are arranged relative to each other along a first direction and a plurality of second loop coils that are arranged relative to each other along a second direction intersecting with the first direction, the first and second loop coils being configured to both generate a magnetic field to induce an induced current in the coil of the position indicator placed near the first and second loop coils and to receive a signal from the position indicator,
a yoke sheet provided on a side of the sensor unit that is opposite to a side of the sensor unit that faces the position indicator,
an auxiliary loop coil provided at a corner part of the sensor unit and configured to only generate a magnetic field to induce an induced current in the coil of the position indicator placed near the auxiliary loop coil,
a signal transmitter configured to transmit a signal to one or more of the first loop coil, the second loop coil, and the auxiliary loop coil in order to generate a magnetic field therefrom, and
a controller configured to selectively supply the signal from the signal transmitter to one or more of the first loop coil, the second loop coil, and the auxiliary loop coil to generate a magnetic field therefrom, and to selectively receive the signal from the position indicator via one or more of the first loop coil and the second loop coil.

9. The position input device according to claim 8, wherein
the controller is further configured to selectively supply the signal from the signal transmitter to the first loop coils arranged relative to each other along the first direction other than those first loop coils provided at first peripheral parts of the sensor unit at both ends of the first direction, and to selectively supply the signal from the signal transmitter to the second loop coils arranged relative to each other along the second direction other than those second loop coils provided at second peripheral parts of the sensor unit at both ends of the second direction, wherein those first and second loop coils provided at the first and second peripheral parts, respectively, are used only to receive the signal from the position indicator.

10. The position input device according to claim 9, wherein the controller is further configured to:
sequentially supply the signal from the signal transmitter to the first loop coils, starting with the first loop coil provided inside one of the first peripheral parts and moving to adjacent ones of the first loop coils toward the other one of the first peripheral parts,
sequentially supply the signal from the signal transmitter to the second loop coils, starting with the second loop coil provided inside one of the second peripheral parts and moving to adjacent ones of the second loop coils toward the other one of the second peripheral parts, and
supply the signal from the signal transmitter to the auxiliary loop coil.

11. The position input device according to claim 9, wherein the controller is configured to selectively supply the signal from the signal transmitter to the second loop coils arranged relative to each other along the second direction other than those loop coils provided at the second peripheral parts to generate a magnetic field relative to the position indicator placed at the first peripheral parts except for portions of the first peripheral parts overlapping with the second peripheral parts, and to selectively supply the signal from the signal transmitter to the first loop coils arranged relative to each other along the first direction other than those first loop coils provided at the first peripheral parts to generate a magnetic field relative to the position indicator placed at the second peripheral parts except for portions of the second peripheral parts overlapping with the first peripheral parts.

12. The position input device according to claim 11, wherein the controller is further configured to:
   a) in the first peripheral parts except for portions thereof that overlap with the second peripheral parts, supply the signal from the signal transmitter to only the second loop coils and to use both the first and second loop coils to receive the signal from the position indicator, and
   b) in the second peripheral parts except for portions thereof that overlap with the first peripheral parts, supply the signal from the signal transmitter to only the first loop coils and to use both the first and second loop coils to receive the signal from the position indicator.

13. The position input device according to claim 12, wherein the controller is further configured to:
   c) in areas of the sensor unit where the first peripheral parts overlap with the second peripheral parts, supply the signal from the signal transmitter to only the auxiliary coil and to use both the first and second loop coils to receive the signal from the position indicator.

14. The position input device according to claim 13, wherein the controller is further configured to:
   d) in a central area of the sensor unit excluding both the first peripheral parts and the second peripheral parts, supply the signal form the signal transmitter to one or both of the first and second loop coils and to use both the first and second loop coils to receive the signal from the position indicator.

15. The position input device according to claim 8, wherein the auxiliary loop coil is disposed at both a corner part and a peripheral part of the sensor unit.

16. The position input device according to claim 8, wherein the first loop coil and the second loop coil are each composed of a pair of longer sides and a shorter end part, and one half the length of a coil wire forming the auxiliary loop coil is shorter than any of the longer sides.

17. The position input device according to claim 8, wherein the sensor unit has a quadrangular shape, and
the auxiliary loop coil is disposed at corner parts at four corners of the sensor unit.

18. The position input device according to claim 8, wherein the auxiliary loop coil is shaped in a quadrangular, circular, or triangular shape.

* * * * *

UNITED STATES PATENT AND TRADEMARK OFFICE
CERTIFICATE OF CORRECTION

| | | |
|---|---|---|
| PATENT NO. | : 8,665,211 B2 | Page 1 of 1 |
| APPLICATION NO. | : 13/045319 | |
| DATED | : March 4, 2014 | |
| INVENTOR(S) | : Noriyuki Kitahara et al. | |

It is certified that error appears in the above-identified patent and that said Letters Patent is hereby corrected as shown below:

In the Claims

Claim 14, Column 22, Line 8:
"the signal form the signal transmitter to one or both of" should read, --the signal from the signal transmitter to one or both of--.

Signed and Sealed this
Third Day of June, 2014

Michelle K. Lee
*Deputy Director of the United States Patent and Trademark Office*